Patented Nov. 6, 1934

1,979,347

UNITED STATES PATENT OFFICE 1,979,347

PROCESS FOR BREAKING PETROLEUM EMULSION

Claudius H. M. Roberts, Long Beach, Calif., assignor to Tretolite Company, Webster Groves, Mo., a corporation of Missouri No Drawing. Application April 13, 1933, Serial No. 665,960

9 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil", and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent used in my process consists of a modified hydrocarbon, such as an olefine, a paraffin, a naphthene, or a heterocyclic compound, or a simple derivative thereof, such as the hydroxy derivative, which has been subjected to chemical reaction so that there is introduced into the hydrocarbon chain an oxygen-containing radical of the hydroxyl type or ketone type or aldehyde type, attached to an inert carbon atom, and furthermore, there is introduced into the hydrocarbon chain a non-labile halogen, such as chlorine. Such a modified hydrocarbon or hydrocarbon derivative may be designated by the following type formula:

$$Z.XO.T$$

in which Z is the hydrocarbon or hydrocarbon derivative residue, XO is an oxygen-containing group of the ketone type, in which X would be a carbon atom, or an aldehyde type in which X would represent a CH combination, or an alcoholiform hydroxyl group, in which case X represents a hydrogen atom. T represents any suitable halogen such as chlorine, bromine, iodine, or fluorine. Due to its low cost and availability, chlorine would be used almost universally as the halogen.

The above type formula is not intended to show the spaced relationship, because it is not intended that the chlorine or halogen be united to the oxygen-containing group, but it may be and usually is united to the hydrocarbon group Z. More than one halogen may be introduced, or more than one oxygen-containing group may be introduced. My invention contemplates the use of reagents of the type T.XO.Z.OX.T, in which the various characters have the same significance as previously. Furthermore, it is not necessary that the hydrocarbon be employed, but one may employ a derivative, such as the carboxy derivative, or the nitro derivative, or the sulfo derivative. Such variants may be expressed by the following type formulas:

$$COOH.Z'.XO.T; \quad HSO_3.Z''.XO.T;$$
$$\text{and} \quad NO_3.Z'''.XO.T.$$

One may indicate the structure of the modified hydrocarbons, whether they do contain or do not contain a derivative group or radical by $$DZ'.XO.T$$

in which $Z'$ is the hydrocarbon residue, D is a hydrogen atom or a derivative radical, and XO and T have their prior significance.

In the reagent used as the demulsifier of my process there is no limitation as to the point at which the halogen group or the derivative group may be added. As previously explained, the halogen group may be chlorine, bromine, etc. If a derivative group, such as a sulfo group, nitro group, carboxy group, etc. is present, it may be attached to the hydrocarbon group or substituted in the hydrocarbon group in any manner without limitation.

However, in regard to an oxygen-containing group of the kind described, it is necessary that it be attached to a non-reactive carbon atom. In a hydrocarbon, such as a paraffin, in which there is present no element other than carbon and hydrogen, and which is completely saturated, one may attach the oxygen-containing group to any carbon atom, because all the carbon atoms are chemically inactive. In the case of stearic acid, in which one carbon atom comprises part of the carboxyl group, it is understood that the oxygen-containing group must be attached to a carbon atom other than this terminal carbon atom, which is part of the carboxylic radical. In the case of an olefine in which there is present an ethylene linkage, it is understood that the oxygen-containing group must be added to a carbon atom other than the carbon atoms adjacent to the ethylene linkage. For instance, in the oxidation of oleic acid for the purpose of producing the treating agent contemplated by my process, it is necessary that one attach oxygen-containing radicals of the kind described to atoms other than the carboxylic carbon or to the carbon atoms adjacent to the ethylene linkage. In a case where ricinoleic acid is used it is necessary that the oxygen-containing radical be attached to a carbon atom other than the carbon atoms adjacent to the ethylene linkage or the carbon atom which is a component of the carboxylic radical, or the carbon atom to which the alcoholiform hydroxyl is attached. The carbon atoms of the kind described will be referred to as reactive carbon atoms. The other carbon atoms of the hydrocarbon chain will be referred to as inactive or inert carbon atoms. Therefore, in the type formula referred to above it is understood that the oxygen-containing radical is attached to an inert carbon atom. If one employs hydrocarbons or hydrocarbon derivatives in which there are reactive carbon atoms, it may be desirable to treat such material with a halogen, such as chlorine, or a reactive halogenator, such as phosphoric pentachloride, so as to completely saturate such materials with the halogen, thus disposing of the active carbon atoms and subsequently subjecting the material to an oxidizing action for the purpose of introducing an oxygen-containing radical in combination with an inert carbon atom.

Although my process contemplates the use of hydrocarbon derivatives such as fatty acids, glycerides, etc., various other materials are admirably adapted for use as the treating agent of my process, such as olefines, paraffins and naphthenes derived from petroleum or petroleum bodies, and especially such non-aromatic materials obtained from petroleum by means of industrial cracking processes, hydrogenation processes, or pyrolysis.

The products or materials intended to be used as the treating agent of my process may be obtained in various manners. The selected hydrocarbon may be subjected to a reaction in which there is present reagents tending to simultaneously introduce both the halogen atom and the oxygen-containing radical. A paraffin body may be subjected to a mixture of nitric and hydrochloric acid, so as to produce an intermediate product of the kind, which, when subjected to hydrolysis with water or steam, is converted into a chlorohydroxy paraffin of the type Cl.OH.Z.

The oxidation of paraffins need not be limited to a mixture of nitric acid and hydrochloric acid, but one may employ well known oxidation processes, such as the kind disclosed in U. S. Patent No. 1,721,959, dated July 23, 1929, to James. In said James patent, such processes are employed on paraffins which have been partially oxidized by catalytic air oxidation and are then subjected to processes involving the use of chromic acid oxidation or hydrochloric acid oxidation,—in which hydrochloric acid plus oxygen are converted into hypochlorous acid,—or by means of nitrogen oxide oxidation. Indeed, one may partially air oxidize the paraffin by the James process referred to in said patent and then employ the various reactions referred to. On the other hand, it may be more economical to conduct the reaction by means of chlorine under pressure and introduce the chlorine as labile and non-labile chlorine atoms. When such a product is subjected to the action of water or steam, the labile chlorine atoms react with water, with the formation of hydroxy radicals.

One simple reaction for preparing the treating agent employed in my process, is one in which a selected olefine is treated with hypochlorous acid in aqueous solution, which converts the olefine into a chlorohydrin. If the selected olefine contains three carbons or more, one can then react the chlorohydrin with a suitable oxidizing agent, such as chromic acid, with the introduction of a hydroxyl group attached to a carbon atom other than the reactive carbon atoms, which have already been saturated with a hydroxyl radical and a chlorine atom.

The production of hydrocarbon chains, to which there has been added an oxygen-containing group in the form of a ketone radical is most readily accomplished by the mild oxidation of the carboxyl of a saturated fatty acid, such as stearic acid. See "Chemical Technology and Analysis of Oils, Fats and Waxes", by Lewkowitsch, sixth edition, vol. 1, page 146. Such ketonic hydrocarbons may be halogenated by a halogen, such as chlorine, to produce a suitable reagent for employment in my process. Oleic acid, may be chlorinated, and then subjected to mild oxidation to give a chloro-ketone hydrocarbon, which is also suitable for use in the contemplated process.

In view of the present knowledge of pressure reactions, and especially when concerned with reactions in the presence of catalysts, it is most economical to employ a non-aromatic hydrocarbon, particularly an aliphatic hydrocarbon, and convert the material into a mixture containing a maximum amount of "aldehyde fatty acids". Aldehyde fatty acids are produced in the following manner: Liquid hydrocarbons are vaporized, mixed with a regulated proportion of oxygen, usually in the form of air, and then passed through a hot conversion zone at a temperature ranging between 200° C. and 500° C. In the hot conversion zone the vapor mixture is subjected to contact with catalytic material composed of the oxides of one or more of the following elements: titanium, vanadium, chromium, manganese, etc. This process is known as the "James" process. With careful regulation of temperature, particularly around 300° to 330° C., one can obtain mixtures containing approximately two thirds of aldehyde fatty acids.

The materials employed as the treating agent of my process may be entirely neutral, or they may be acidic in nature, due to the presence of a carboxyl or other acid radical. For instance, naphthenic acid may be treated so as to introduce an oxygen-containing group and also a halogen without destruction of the carboxyl. Likewise, such material may be subjected to the sulfation or sulfonation reaction so as to introduce a sulfo radical. The expression "sulfo radical" is intended to include both the $HSO_3$ radical and the $HSO_4$ radical. For instance, a long chain olefine may be treated with sulfuric acid so as to add a hydrogen atom and a hydrogen sulfuric acid radical. Such material might be subjected to subsequent reaction so as to introduce an oxygen-containing group of the kind described and also a halogen. Similarly, one might introduce other radicals, such as nitro radicals, phosphoric acid radicals, etc.

Wherever the reagents are acidic in nature, due to an acid hydrogen, it is understood, of course, that the acid hydrogen may be replaced by a metal, as in the case of a salt, or by an organic radical in the case of an ester, or by an ammonium radical, or by reaction with a basic amine, such as triethanolamine, or in the case of a carboxylic group, the hydroxyl or the carboxyl may be replaced by the hydrogen of the amine, producing an acyl amine derivative or the like.

The preferred reagent of my process is produced in the following manner: Pennsylvania petroleum distillate boiling between 250° and 325° C. and having a specific gravity of .8125 at 20° C. is subjected to the James partial oxidation process, as described in U. S. Patent No. 1,681,237, dated August 21, 1928, to James, so as to produce a mixture containing approximately 70% or more of aldehyde fatty acids and less than 30% of a mixture of aldehydes and unreacted hydrocarbons. The mixture resulting from such partial oxidation process is subjected to distillation so that the aldehydes and hydrocarbons which are more volatile than the aldehyde fatty acids, are distilled off and separated from the fatty acids. The separation may be conducted most conveniently by means of superheated steam. The aldehyde fatty acids thus obtained are typified by the following formula:

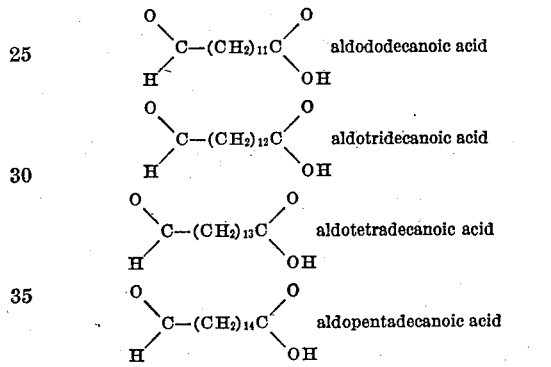

After complete dehydration, the purified aldehyde fatty acids are then subjected to a reaction so that a non-labile halogen, such as chlorine or bromine, preferably chlorine, is introduced into the hydrocarbon chain. Such reaction may be conducted under pressure at elevated temperature. I prefer to treat the aldehyde fatty acids with a molecular proportion of chlorine under a pressure of approximately 100 to 200 lbs. and with a suitable temperature so that the chlorine is rapidly absorbed. Under such pressures and at a temperature of about 95° C. the chlorine is apparently absorbed in six hours or less. The reaction must be conducted in absence of water and the aldehyde fatty acids must be substantially anhydrous before subjecting them to a chlorination process. In the finished product the halogen is substantially non-labile and fixed in the hydrocarbon chain. As previously suggested, the material may be used in the acidic form, or it may be used in the form of a water-soluble salt, such as the sodium, potassium or ammonium salt. It may be used after neutralization with an amine, or it may be used after esterification with any suitable alcohol, such as ethyl alcohol or the like. I prefer to use the material in the form of an ammonium salt. If desired, in the case of the aldehyde fatty acids, which are dibasic, one may neutralize or esterify or react on one carboxyl group and not on the other.

The water-soluble form of the reagent produced by neutralization with caustic soda or caustic potash, may be reacted with a water-soluble salt of any suitable metal, such as aluminum, copper, iron, zinc, calcium, or magnesium, and thus, by metathesis one may obtain these various metallic salts. They may be employed, but appear to offer no advantage over the sodium or potassium or ammonium salt or the acidic material itself. Neutralization with triethanolamine or a similar basic amine gives a suitable product.

Suitable hydrocarbons which may be used in producing the reagent of my process include saturated aliphatic hydrocarbons of the methane series, such as hexane; unsaturated aliphatic hydrocarbons, such as hexylene; non-benzenoid, cyclic, naphthene-type hydrocarbons, such as cyclohexane, the terpenes, etc.; and heterocyclic compounds, such as pyridine. In addition, unsaturated hydrocarbons containing more than one ethylene linkage are suitable for use in producing the reagent of my process, although in view of the relative ease with which such materials are oxidized to simple substances, it will usually be desirable to first halogenate them and then treat with a suitable oxidizing agent, to introduce the desired oxygen-containing group, particularly by mild oxidation so as to introduce a ketone group. In addition, simple derivatives of hydrocarbons of the above types, such as hydroxy, carboxy, amino, etc. derivatives may be equally well employed in producing the reagent of my process. While it is recognized that heterocyclic compounds are not, strictly speaking, hydrocarbons, since they contain elements other than carbon in the ring, nevertheless, they are the equivalents of ring compounds containing only carbon insofar as addition or substitution reactions are concerned, while, in addition, they possess particular advantages over cyclic compounds containing carbon only due to the properties possessed by the asymmetric carbon atoms adjacent to the non-carbonaceous element or elements in the ring. I have, therefore, defined such materials as heterocyclic, hydrocarbon-like compounds.

The materials previously described need not be employed alone, as a demulsifying agent, but may be employed in conjunction with other suitable demulsifiers, such as water softeners, modified fatty acids, oil-soluble or water-soluble petroleum sulfonic acids, substituted aromatic sulfonic acids, dialkyl sulfo acids, substituted amine acidic bodies, etc., or the salts and esters of the same or the like. One may add any suitable inert solvent or solvents to the reagent contemplated, particularly solvents which would lower the viscosity of the product and make it more adaptable for use, such as kerosene, solvent naphtha, cresol, pine oil, ethyl alcohol, butyl alcohol, propyl alcohol, etc.

In practising my process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced, introducing the treating agent into a conduit through which the emulsion is flowing, introducing the treating agent into a tank in which the emulsion is stored, or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges, or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils", the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 10,000 parts of emulsion will usually be found to produce commercially satisfactory results.

Having thus described my invention, what I claim as new and desire to secure by Letters Patent is:

1. A process for breaking a petroleum emulsion of the water-in-oil type, which consists in subjecting the emulsion to the action of a demulsifying agent consisting of a modified hydrocarbon of the type DZ'.XO.T; in which Z' is a petroleum hydrocarbon residue, D is a hydrogen atom or a derivative radical, XO is an oxygen-containing radical selected from the class consisting of hydroxyl radicals, aldehyde radicals or ketone radicals attached to an inert carbon atom of the hydrocarbon residue, and T is a halogen.

2. A process for breaking a petroleum emulsion of the water-in-oil type, which consists in subjecting the emulsion to the action of a demulsifying agent consisting of a modified hydrocarbon of the type DZ'.XO.T; in which Z' is a petroleum hydrocarbon residue, D is a hydrogen or a derivative radical, XO is an oxygen containing radical attached to an inert carbon atom of the hydrocarbon residue, and T is a halogen.

3. A process for breaking a petroleum emulsion of the water-in-oil type, which consists in subjecting the emulsion to the action of a demulsifying agent consisting of a modified hydrocarbon of the type DZ'.XO.T; in which Z' is the hydrocarbon residue, D is a hydrogen or a derivative radical, XO is an aldehyde radical attached to an inert carbon atom of the hydrocarbon residue, and T is a halogen.

4. A process for breaking a petroleum emulsion of the water-in-oil type, which consists in subjecting the emulsion to the action of a demulsifying agent consisting of a modified hydrocarbon of the type DZ'.XO.T; in which Z' is a petroleum hydrocarbon residue, D is a hydrogen or a derivative radical, XO is an oxygen containing radical of the hydroxyl-aldehyde-ketone type and is attached to an inert carbon atom of the hydrocarbon residue, and T is a halogen.

5. A process for breaking a petroleum emulsion of the water-in-oil type, which consists in subjecting the emulsion to the action of a demulsifying agent consisting of a modified paraffin hydrocarbon of the type DZ'.XO.T; in which Z' is the hydrocarbon residue, D is a hydrogen atom or a derivative radical, X represents a CH radical, and T is a halogen.

6. A process for breaking a petroleum emulsion of the water-in-oil type, which consists in subjecting the emulsion to the action of a demulsifying agent consisting of a modified paraffin hydrocarbon of the type DZ'.XO.T; in which Z' is the hydrocarbon residue, D is a hydrogen atom, X represents a CH radical, and T is a chlorine atom.

7. A process for breaking a petroleum emulsion of the water-in-oil type which consists in subjecting the emulsion to the action of a demulsifying agent consisting of a modified hydrocarbon of the type DZ'.XO.T; in which Z is a petroleum hydrocarbon residue, D is a hydrogen atom or a derivative radical, XO is an oxygen containing radical of the hydroxyl-aldehyde-ketone type and is attached to an inert carbon atom of the hydrocarbon residue, and T is a halogen, and in which some aldehyde radicals must be present and others of the above mentioned type may also be present.

8. A process for breaking a petroleum emulsion of the water-in-oil type which consists in subjecting the emulsion to the action of a demulsifying agent consisting of a modified hydrocarbon of the type DZ'.XO.T; in which Z is a petroleum hydrocarbon residue, D is a hydrogen atom or a derivative radical, XO is an oxygen containing radical of the hydroxyl-aldehyde-ketone type and is attached to an inert carbon atom of the hydrocarbon residue, and T is a halogen, and in which some aldehyde radicals must be present and others of the above mentioned type are present.

9. A process for breaking a petroleum emulsion of the water-in-oil type which consists in subjecting the emulsion to the action of a demulsifying agent obtained by chlorination of the crude aldehyde-containing oxidation product, derived by partial oxidation of petroleum distillate.

CLAUDIUS H. M. ROBERTS.